(12) United States Patent
Üstünberk et al.

(10) Patent No.: US 11,059,398 B2
(45) Date of Patent: Jul. 13, 2021

(54) DISCONTINUOUS RECLINER FOR A VEHICLE SEAT

(71) Applicant: MARTUR ITALY S.R.L., Milan (IT)

(72) Inventors: Can Üstünberk, Grugliasco (IT); Luigi Spagnoli, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 30 days.

(21) Appl. No.: 16/614,546

(22) PCT Filed: Apr. 17, 2019

(86) PCT No.: PCT/IB2019/053171
§ 371 (c)(1),
(2) Date: Nov. 18, 2019

(87) PCT Pub. No.: WO2019/215523
PCT Pub. Date: Nov. 14, 2019

(65) Prior Publication Data
US 2020/0180475 A1 Jun. 11, 2020

(30) Foreign Application Priority Data

May 9, 2018 (IT) .................. 102018000005223

(51) Int. Cl.
*B60N 2/235* (2006.01)

(52) U.S. Cl.
CPC .......... *B60N 2/2356* (2013.01); *B60N 2/236* (2015.04)

(58) Field of Classification Search
CPC ...... B60N 2/2356; B60N 2/235; B60N 2/236; B60N 2/2209; B60N 2/2227

USPC ...................................... 297/367 P
See application file for complete search history.

(56) References Cited

U.S. PATENT DOCUMENTS

| | | | |
|---|---|---|---|
| 9,296,314 B2 * | 3/2016 | Yamada | B60N 2/2356 |
| 2003/0155800 A1 | 8/2003 | Asano | |
| 2006/0261657 A1 | 11/2006 | Luo et al. | |
| 2010/0269615 A1 | 10/2010 | Endou et al. | |
| 2011/0006583 A1 | 1/2011 | Schwarze et al. | |
| 2015/0360589 A1 * | 12/2015 | Robinson | B60N 2/236 297/367 P |
| 2017/0203671 A1 * | 7/2017 | Runde | B60N 2/236 |
| 2018/0103760 A1 * | 4/2018 | Fujita | B60N 2/235 |

FOREIGN PATENT DOCUMENTS

| | | |
|---|---|---|
| CN | 202480915 U | 10/2012 |
| CN | 103070564 A | 5/2013 |
| CN | 103507668 A | 1/2014 |
| DE | 102008018623 A1 | 10/2009 |
| DE | 102009058449 A1 | 6/2010 |
| EP | 1724149 A1 | 11/2006 |
| KR | 1706336 B1 * | 2/2017 |

* cited by examiner

*Primary Examiner* — Milton Nelson, Jr.
(74) *Attorney, Agent, or Firm* — Howson & Howson LLP

(57) ABSTRACT

A discontinuous recliner for a vehicle seat is provided. The discontinuous recliner comprises one or more locking pawls and a single actuating element which is configured to drive the locking pawl(s) both from the locking position to the unlocking position and from the unlocking position to the locking position. Thanks to the provision of the single actuating element, the overall number of components of the discontinuous recliner is significantly reduced. This allows to obtain a discontinuous recliner which is lighter, easier to be assembled and more reliable.

13 Claims, 8 Drawing Sheets

DISCONTINUOUS RECLINER FOR A VEHICLE SEAT

TECHNICAL FIELD

The present invention relates to a discontinuous recliner for a vehicle seat.

More particularly, the present invention relates to a discontinuous recliner for a vehicle seat having a simple structure and a limited number of components.

BACKGROUND ART

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

This reclining function is generally implemented by a reclining device arranged at the junction between the seat cushion and the seat backrest.

Discontinuous recliners are known from the state of the art which comprise a first disc-shaped plate connectable to a first bracket attached to the seat cushion and a second disc-shaped plate connectable to a second bracket attached to the seat backrest.

In a rest condition, the first and second plates are locked in rotation relative to each other and the inclination of the seat backrest with respect to the seat cushion is fixed. However, by applying a torque, the first and second plates can be rotated relative to each other, thus obtaining a variation in the inclination of the seat backrest with respect to the seat cushion.

To this purpose, the peripheral rim of a first one of said plates is provided with teeth on its inner surface and the second plate is provided with one or more locking pawls which are movable in the radial direction and which are provided with teeth at their outer surface.

A first cam (or locking cam), biased by one or more springs, pushes the locking pawls outwardly, towards the peripheral rim of the first plate, so that the teeth of the locking pawls engage the teeth on the peripheral rim of the first plate, thus preventing a rotation of the plates relative to each other.

By applying a torque sufficient to overcome the resistance of the spring(s), a second cam (or unlocking cam) is rotated and, upon rotating, it pulls the locking pawls inwardly, thus disengaging the teeth of said locking pawls from the teeth on the peripheral rim of the first plate and allowing a rotation of the plates relative to each other and a resulting adjustment of the inclination of the seat backrest with respect to the seat cushion.

When the torque is removed, the action of the spring(s) on the first cam pushes again the locking pawls outwardly, against the peripheral rim of the first plate.

Such discontinuous recliners are disclosed, for instance, in documents EP 1 724 149, CN 103507668, CN 202480915 and US 2003/155800.

In general, such known discontinuous recliners comprise a high number of separate components, which involves several drawbacks.

First of all, the presence of manufacturing tolerances of such components and/or clearances between them may cause malfunction of the recliner.

Secondly, assembling the discontinuous recliner is expensive and time consuming.

Thirdly, the high number of components lead to a considerable weight of the discontinuous recliner, which represents a severe drawback, as vehicle manufacturers constantly aim to reduce the vehicle overall weight.

Therefore, the main object of the present invention is to obviate such drawbacks, by providing a discontinuous recliner which comprises a reduced number of components.

A further object of the present invention is to provide a discontinuous recliner which is simpler, lighter and more reliable than discontinuous recliners of prior art.

These and other objects are achieved by a discontinuous recliner as claimed in the appended claims.

SUMMARY OF INVENTION

The discontinuous recliner according to the invention comprises a single actuating element which is configured to drive the locking pawl(s) both from the locking position to the unlocking position and from the unlocking position to the locking position.

In a preferred embodiment of the invention, the discontinuous recliner comprises one or more locking pawls provided with teeth at their outer surface, each of said pawls being provided with a shaped profile at its inner surface and with a peg oriented towards the actuating element.

Correspondingly, the actuating element is provided with a plurality of projections, one for each pawl, having a shaped profile, configured to cooperate with the shaped profile of the inner surface of the locking pawls for pushing said pawls outwardly in the radial direction, towards their locking position; the actuating element is also provided with a plurality of kidney-shaped slots, one for each pawl, so that the peg of each pawl penetrates into a corresponding slot of the actuating element and engages the edge of said slot, whereby, upon rotation of the actuating element, said pawls are pulled inwardly in the radial direction, towards their unlocking position.

The discontinuous recliner also typically comprises one or more return springs for biasing the actuating element to a configuration in which the locking pawls are in their locking position.

According to a preferred embodiment of the invention, the discontinuous recliner includes a single return spring and the actuating element comprises a seat for said return spring. Accordingly, the actuating element can also be considered as a spring disc.

As the actuating element of the present invention drives the locking pawls both to their locking position and to their unlocking position and it further provides for a seat for the return spring, the overall number of components of the discontinuous recliner is significantly reduced with respect to prior art.

This involves several remarkable advantages.

First of all, the risk that manufacturing tolerances and/or clearances between the components lead to a malfunction of the recliner is strongly reduced.

Secondly, the reduced number of parts leads to a reduction of the time needed for the assembly sequence cycle.

Thirdly, the overall weight of the discontinuous recliner can be reduced with respect to known recliners, which represents a remarkable advantage for vehicle manufacturers.

BRIEF DESCRIPTION OF DRAWINGS

Further features and advantages of the invention will become more evident from the detailed description of some preferred embodiments thereof, given by way of non-limiting example, with reference to the attached drawings, in which:

FIG. 11a is an enlarged view of the central portion of FIG. 10a;

DESCRIPTION OF EMBODIMENTS

Figure 1:
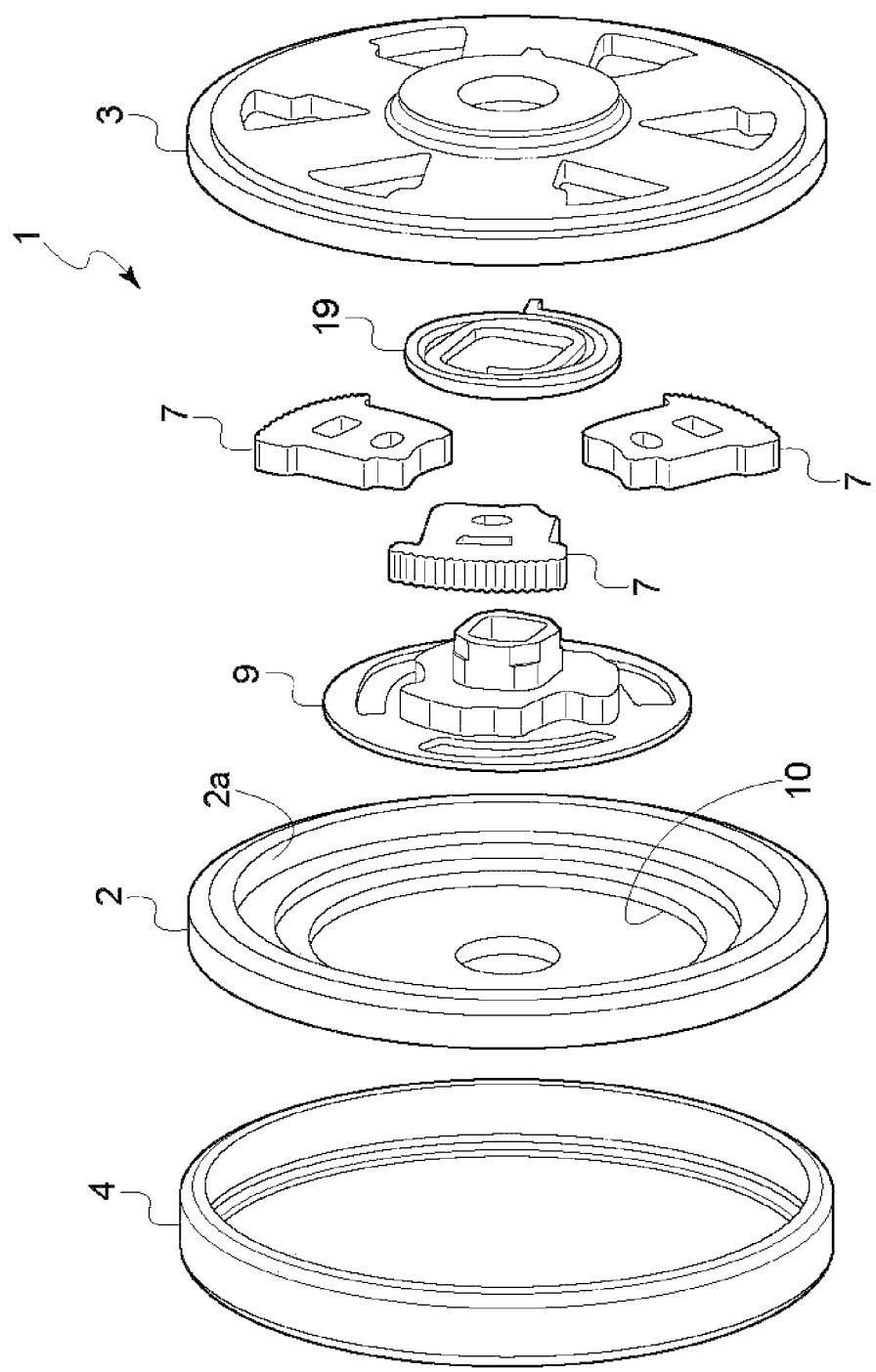
FIG. 1 is an exploded view of a discontinuous recliner according to a first preferred embodiment of the invention.
Figure 2:
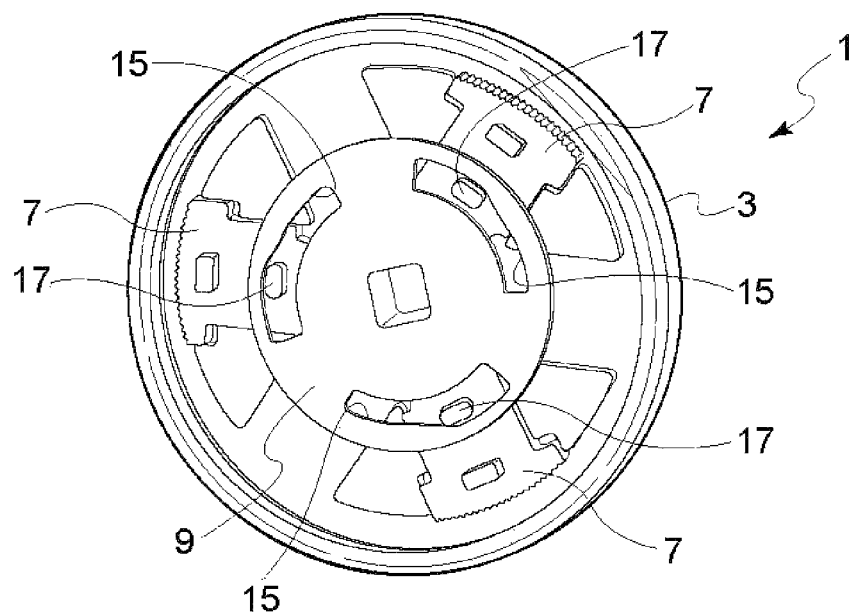
FIG. 2 is a front view of the discontinuous recliner of FIG. 1, with the first plate removed for ease of understanding.
Figure 3:
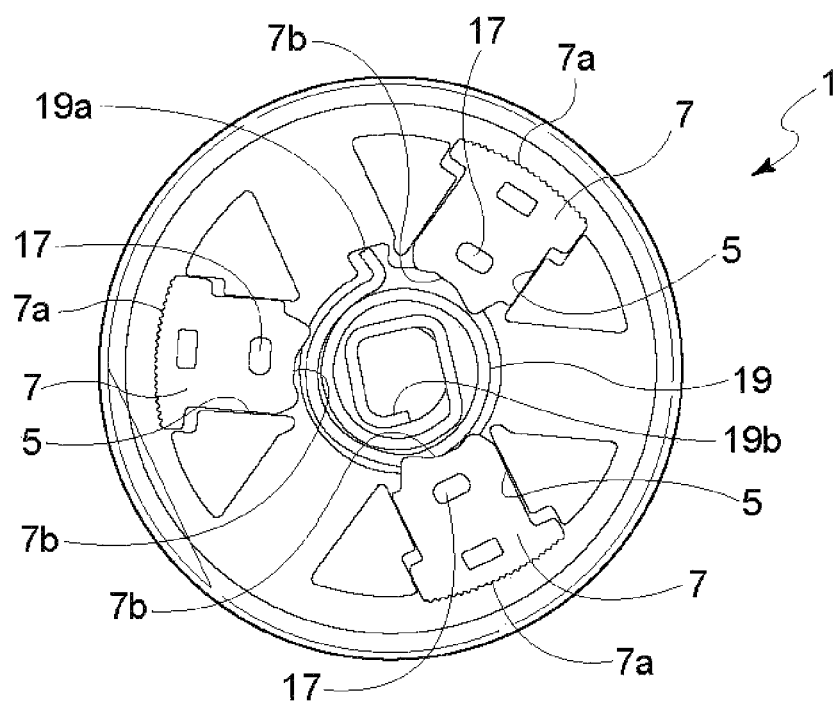
FIG. 3 is a front view of the discontinuous recliner of FIG. 1, with the first plate and the actuating element removed.
Figure 4:
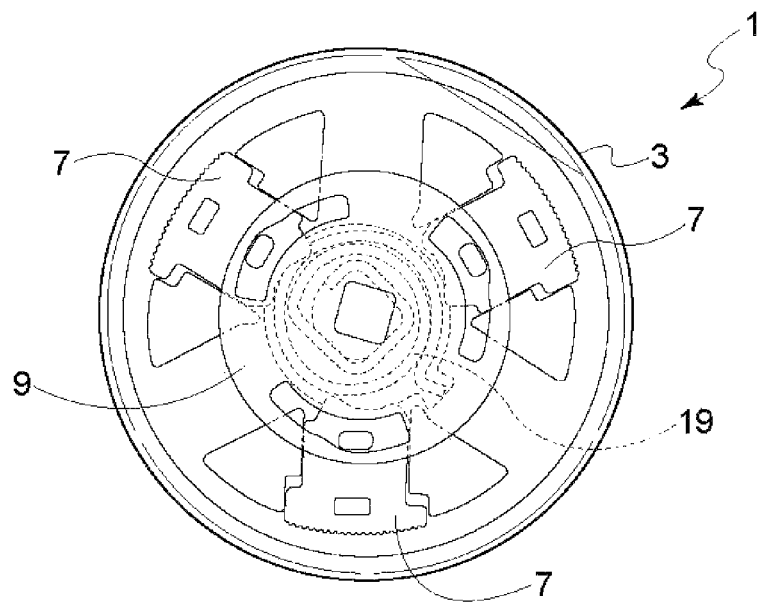
FIG. 4 is a see-through perspective view of the discontinuous recliner of FIG. 1.

With reference to FIGS. 1 to 4, a discontinuous recliner 1 according to a first embodiment of the invention is shown.

In a per se known manner, said discontinuous recliner 1 comprises a first disc-shaped plate 2, which is provided with first engaging means for being connected to a first bracket that can be attached to a seat cushion (or to a seat backrest), and a second disc-shaped plate 3, which is provided with second engaging means for being connected to a second bracket that can be attached to a seat backrest (or to a seat cushion).

The first and second plates 2, 3 substantially have the same diameter so that they can be coupled to each other. To this purpose, the discontinuous recliner 1 may further comprise a cover 4, namely an annular cover, for coupling together the first and second plates 2, 3.

The first plate 2 comprises a peripheral rim 2a oriented towards the second plate 3 and provided with teeth on its inner surface, or at least on sections of its inner surface.

The second plate 3 comprises, on its surface oriented towards the first plate, a plurality of radial guiding grooves 5 receiving respective locking pawls 7 (three in the shown embodiment), which are movable in the radial direction along said guiding grooves. The guiding grooves 5 and the locking pawls 7 are preferably equally spaced along the circumference of the second plate 3 (i.e. they are arranged at 120° relative each other in the shown embodiment).

The locking pawls 7 have a curved outer surface 7a, having substantially the same curvature radius as the first and second plates and provided with teeth. Accordingly, the teeth of the locking pawls can engage the teeth of the inner surface of the peripheral rim 2a of the first plate 2 when said locking pawls are moved in the radial direction to their outermost position (locking position), thus preventing any relative rotation between the first and second plate. On the other hand, when the locking pawls 7 are moved inwardly in the radial direction, away from the peripheral rim 2a of the first plate 2 (unlocking position), a relative rotation between the first and second plate is allowed.

Figure 5:
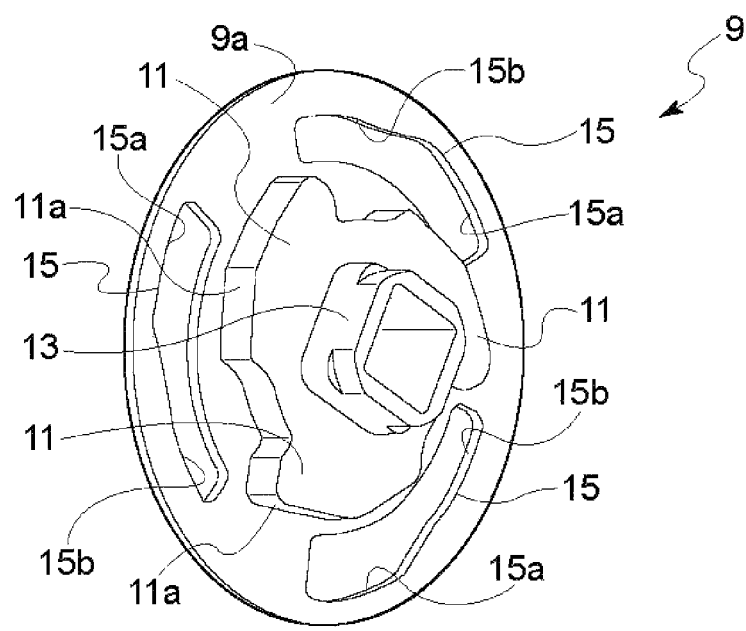
FIG. 5 is a perspective view of the actuating element of the discontinuous recliner of FIGS. 1-4.
Figure 6:
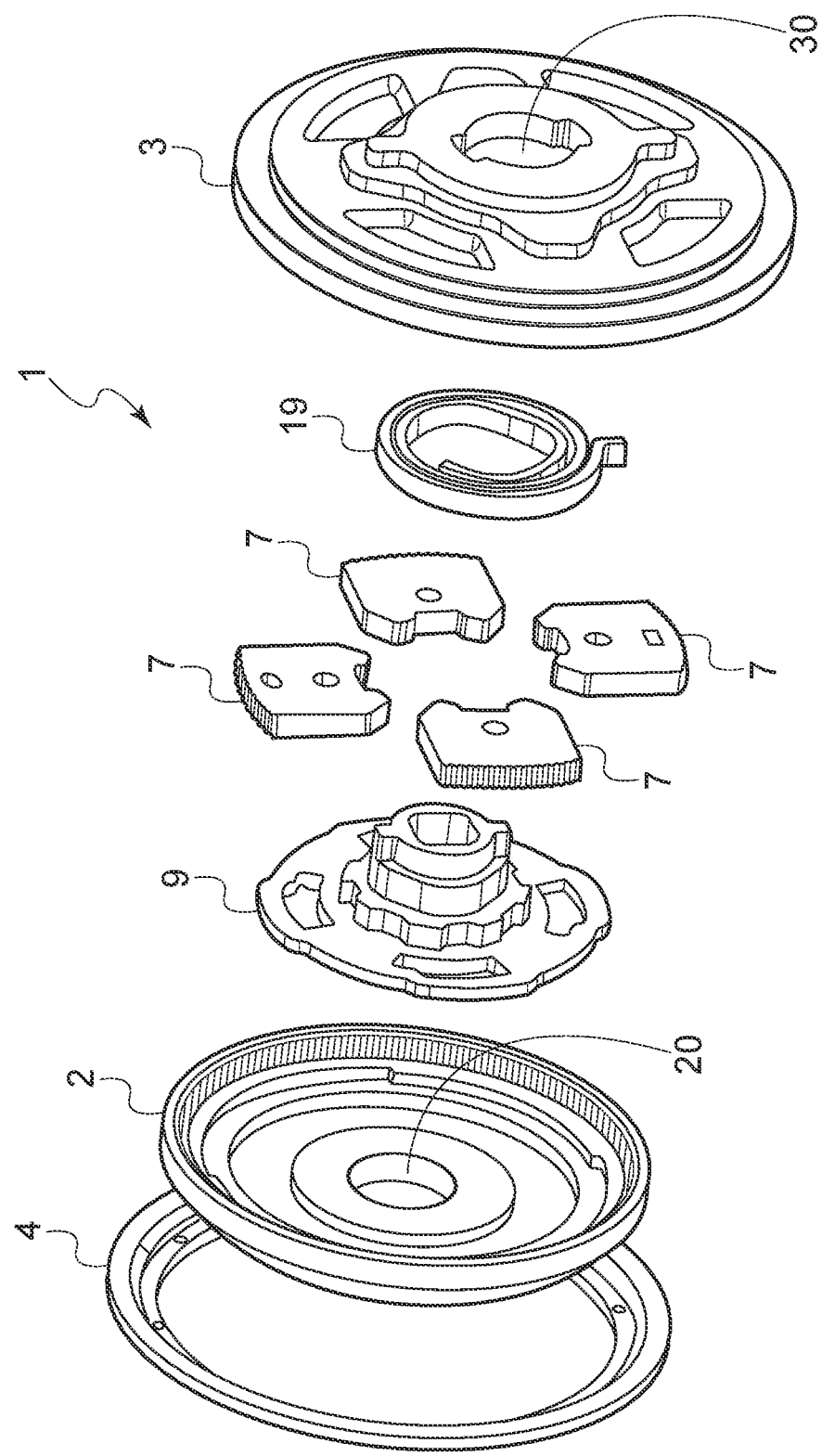
FIG. 6 is an exploded view of a discontinuous recliner according to a second preferred embodiment of the invention.

According to the invention, the discontinuous recliner 1 is provided with a single actuating element 9 (shown in greater detail in FIG. 5) for driving the locking pawls 7 both from their unlocking position to their locking position and from their locking position to their unlocking position.

The actuating element 9 lies on the surface of the first plate 2 oriented towards the second plate 3 and it has a flat body 9a, preferably having the overall shape of a disc. The first plate 2 is correspondingly provided with a circular seat 10 receiving the actuating element 9.

In order to drive the locking pawls 7 from their unlocking position to their locking position, the actuating element 9 comprises a plurality of projections 11 (one for each locking pawl 7, i.e. three in the shown embodiment) protruding towards the second plate 3; the outer surface 11a in the radial direction of each projection 11 has a shaped profile (e.g. a cam-shaped profile) and, correspondingly, the inner surface 7b in the radial direction of each locking pawl 7 has a correspondingly shaped profile (e.g. a cam-shaped profile), whereby the shaped profiles of the outer surface 11a of the projections 11 of the actuating element 9 and the shaped profiles of the inner surface 7b of the locking pawls 7 cooperate for pushing said locking pawls 7 to their outermost, locking position.

A return spring 19 biases the actuating element 9 towards a position in which the shaped profiles of the outer surface 11a of the projections 11 of the actuating element 9 push the locking pawls 7 to said locking position.

In the shown embodiment, the return spring 19 has the shape of a spiral, with a first, outer end 19a inserted in a hole provided in the second plate 3, and a second, inner end 19b wound to form a square and fitted on a square boss 13 provided on the actuating element 9.

In order to drive the locking pawls 7 from their locking position to their unlocking position, the body 9a of the actuating element 9 comprises a plurality of kidney-shaped slots 15 (one for each locking pawl 7, i.e. three in the shown embodiment); each slot 15 has a first section 15a which is farther from the center of the body 9a of the actuating element 9, and a second section 15b that progressively extends closer to the center of said body 9a of said actuating element. Correspondingly, each locking pawl 7 is provided with a peg 17 projecting towards the first plate and arranged so as to penetrate into a corresponding slot 15 and to engage the edge of said slot. More particularly, with the locking pawls in their locking position, the pegs 17 of the locking pawls 7 engage the edge of the respective slots 15 at the first section 15a of said slots.

By applying a torque in the appropriate direction (in the direction of arrow F in the shown embodiment), the actuating element 9 is rotated, overcoming the resistance of the return spring 19.

As the actuating element 9 rotates, the pegs 17 of the locking pawls 7 slide along the respective slots 15 of said actuating element. When the pegs 17 enter the second section 15b of said slots, the locking pawls 7 are progressively pulled inwardly, away from the peripheral rim of the first plate; correspondingly the shaped profiles of the outer surface 11a of the projections 11 of the actuating element 9 and the shaped profiles of the inner surface 7b of the locking pawls 7 accommodate such inward movement of the locking pawls. As a result, the locking pawls 7 are brought to their unlocking position, in which the teeth on the outer surface 7a of said pawls no longer engage the teeth on the inner surface of the peripheral rim of the first plate.

With the pawls in such unlocking position, the first and second plates can be rotated relative to each other, so that the user can adjust the inclination of the seat backrest with respect to the seat cushion.

When the torque is removed, the return spring 19 will urge the actuating element 9 to rotate in the opposite direction, thus bringing back the locking pawls 7 to their locking position.

Thanks to the provision of the single actuating element 9, which is capable of driving the locking pawls 7 both from their locking position to their unlocking position and from their unlocking position to their locking position, the overall number of components is considerably lower than in known discontinuous recliners (namely, two plates, one actuating element, one spring, one or more locking pawls).

Accordingly, the risk of malfunction of the discontinuous recliner 1 due to manufacturing tolerances and/or clearances between the components is strongly reduced.

Moreover, the discontinuous recliner 1 can be assembled in an easier and quicker way than known discontinuous recliners.

Last but not least, the overall weight of the discontinuous recliner 1 can be reduced with respect to known recliners.

The actuating element can be made of any suitable material, such as steel. It can be manufactured by any appropriate techniques, such as casting or sintering.

With reference now to FIGS. 6 to 12, a discontinuous recliner 1 according to a second embodiment of the invention is shown.

The structure and operation of the discontinuous recliner 1 shown in FIGS. 6-12 are very similar to those of the discontinuous recliner shown in FIG. 1-4.

Accordingly, components that are identical or similar to respective components already described with reference to the first embodiment are denoted by the same references and they will not be described in detail in the following.

In this second embodiment, too, the discontinuous recliner 1 comprises a first disc-shaped plate 2 and a second disc-shaped plate 3, which are coupled to each other.

To this purpose, the discontinuous recliner 1 may further comprise a cover 4, namely an annular cover, for coupling together the first and second plates 2, 3.

In this second embodiment, too, the first plate 2 comprises a peripheral rim oriented towards the second plate 3 and provided with teeth on its inner surface, or at least on sections of its inner surface and the second plate 3 comprises, on its surface oriented towards the first plate, a plurality of radial guiding grooves receiving respective locking pawls 7 (which, in this second embodiment are four, arranged at 90° relative each other).

In this second embodiment, too, the teeth of the locking pawls 7 can engage the teeth of the inner surface of the peripheral rim of the first plate 2 when said locking pawls are moved in the radial direction to their outermost position (locking position), and they can be disengaged from the teeth of the inner surface of the peripheral rim of said first plate 2 when said locking pawls are moved inwardly in the radial direction (unlocking position), thus allowing a relative rotation between the first and second plate.

In this second embodiment, too, the discontinuous recliner 1 is provided with a single actuating element 9 for driving the locking pawls 7 both from their unlocking position to their locking position and from their locking position to their unlocking position: in order to drive the locking pawls 7 from their unlocking position to their locking position, the actuating element 9 comprises a plurality of projections 11 cooperating with the profiles of the locking pawls cooperate for pushing said locking pawls 7 to their outermost, locking position; in order to drive the locking pawls 7 from their locking position to their unlocking position, the actuating element 9 comprises a plurality of kidney-shaped slots 15 and, correspondingly, each locking pawl 7 is provided with a peg 17, penetrating into a corresponding slot 15 and engaging the edge of said slot.

In this second embodiment, too, a return spring 19 (preferably having the shape of a spiral) biases the actuating element 9 towards the locking position.

Figure 7:
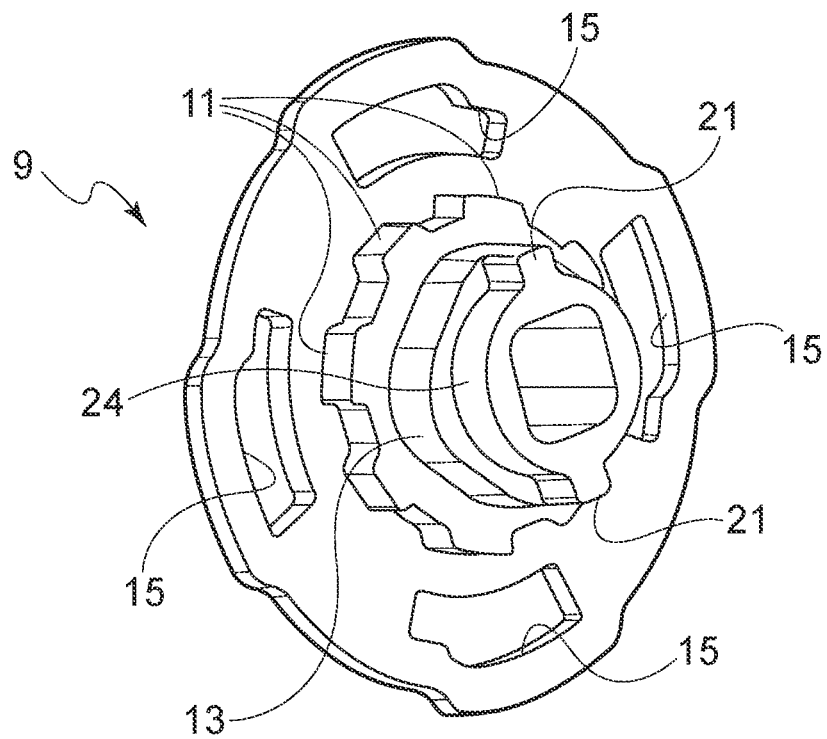
FIG. 7 is a perspective view of the actuating element of the discontinuous recliner of FIG. 6.
Figure 8:
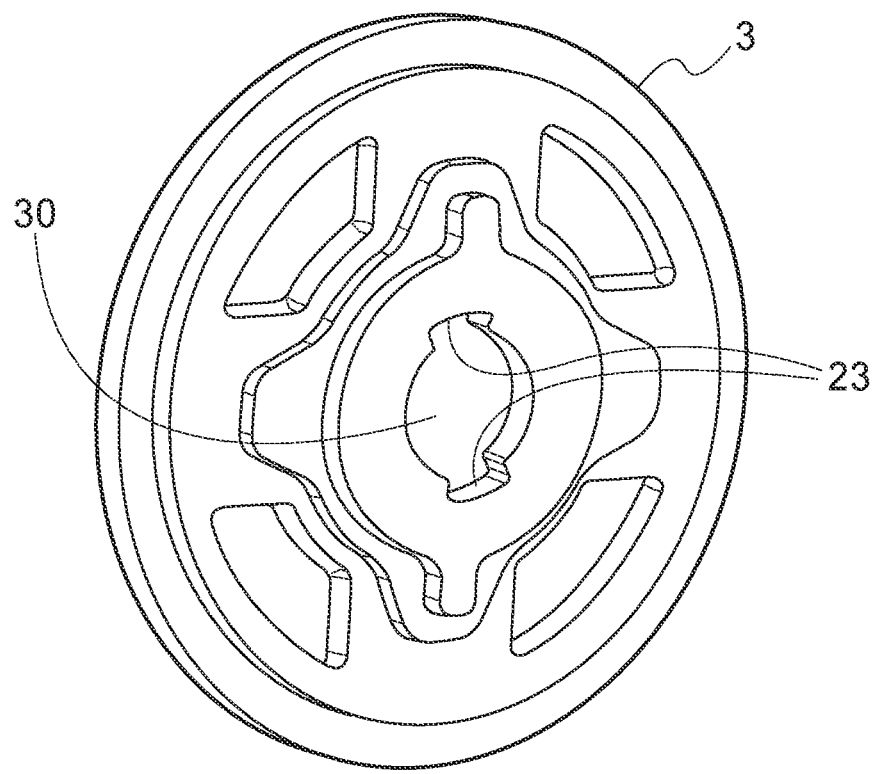
FIG. 8 is a perspective view of the second disc-shaped plate element of the discontinuous recliner of FIG. 6.

As better shown in FIGS. 7 and 8, the discontinuous recliner 1 according to this second preferred embodiment differs from the one of the previously described, first preferred embodiment in that the actuating element 9 is provided, on its surface oriented towards the second plate 3, with a cylindrical protrusion 24 carrying one or more humps 21, which engage corresponding window(s) 23 provided along a matching hole 30 centrally arranged in said second plate 3.

The humps 21 on the actuating element, as well as the windows 23 in the second plate preferably are equally spaced along the circumference of said actuating element and of said second plate, respectively.

In detail, in the shown embodiment, the actuating element 9, is provided, on its on its surface oriented towards the second plate 3, with two humps 21 arranged at 180° relative each other, and the second plate 3 is correspondingly provided with two windows 23, arranged at 180° relative each other, whereby each hump 21 engages a corresponding window 23.

Advantageously, the engagement between the humps 21 of the actuating element 9 and the windows 23 of the second plate 3 allows to protect the discontinuous recliner 1 from excessive load exerted by the user when switching the recliner 1 from the locking position to the unlocking position.

Figure 9A:
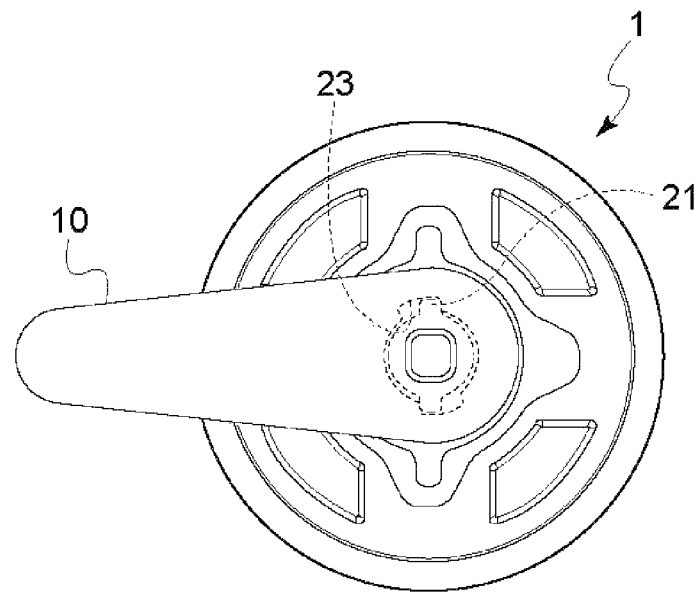
FIG. 9a shows the discontinuous recliner of FIG. 6 in a locking position.
Figure 9B:
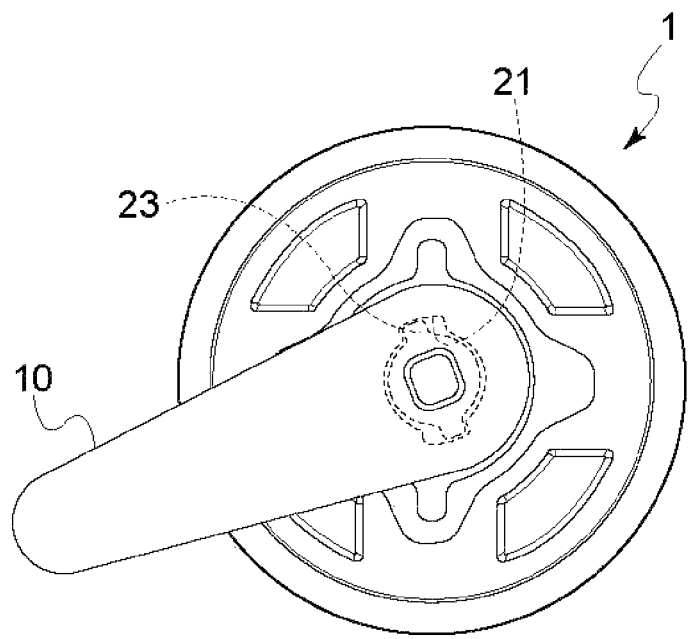
FIG. 9b shows the discontinuous recliner of FIG. 6 in an unlocking locking position.
Figure 10A:
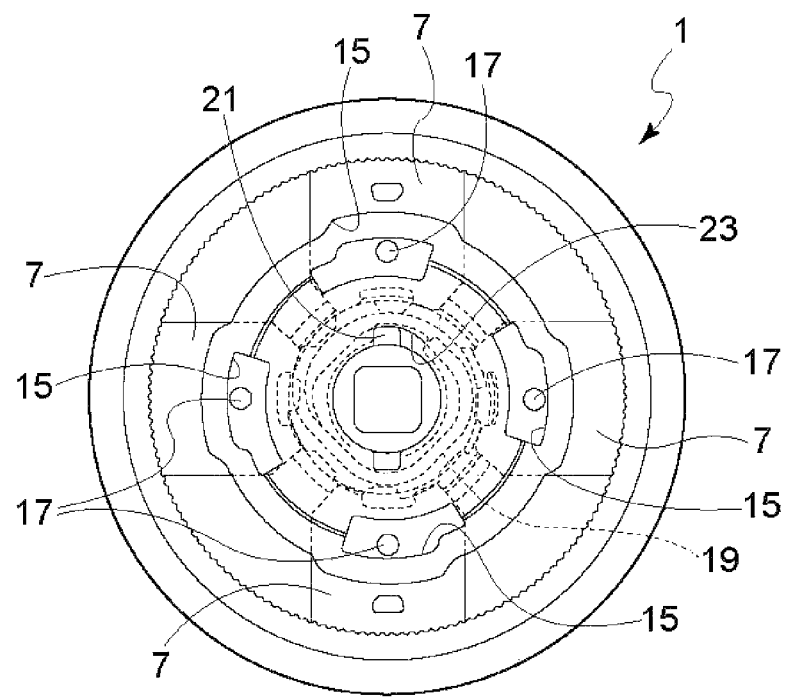
FIG. 10a shows the discontinuous recliner of FIG. 6 in a locking position.
Figure 10B:
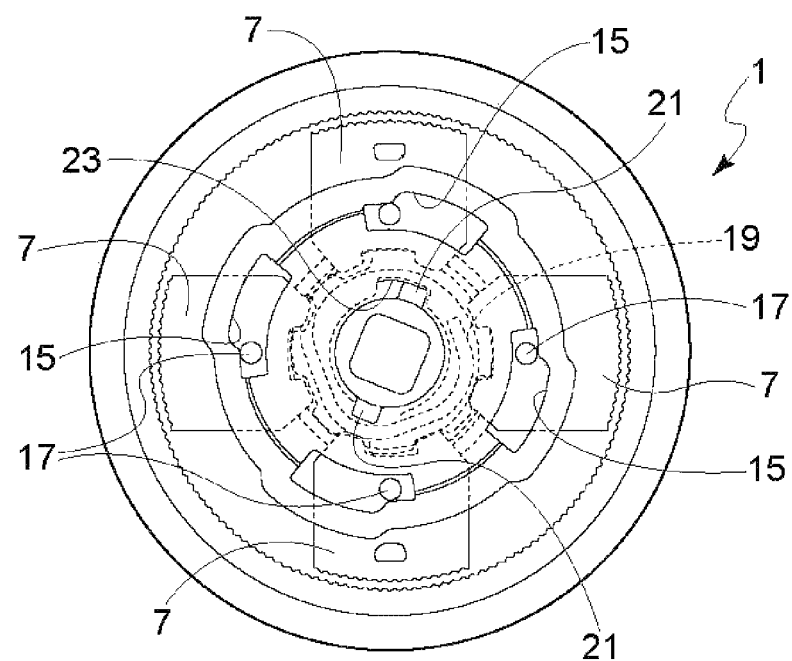
FIG. 10b shows the discontinuous recliner of FIG. 6 in an un locking position.
Figure 11A:
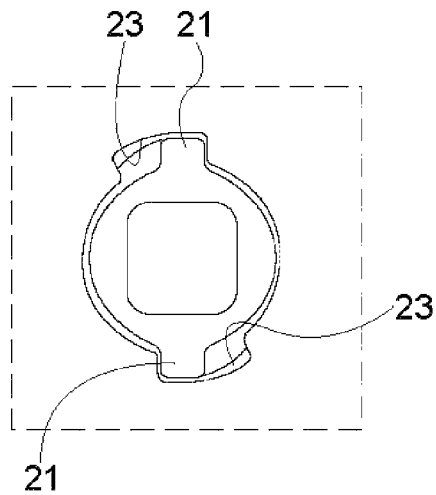
Figure 11B:
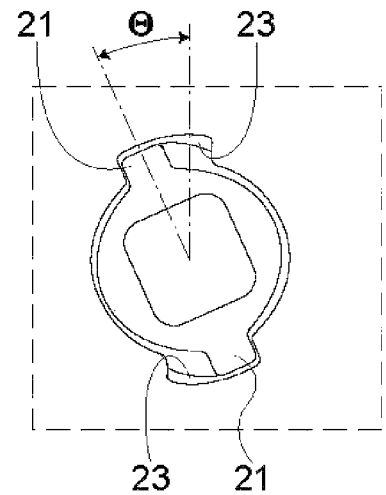
FIG. 11b is an enlarged view of the central portion of FIG. 10b.

In this respect, in FIGS. 9a and 9b the discontinuous recliner 1 according to the invention is shown along with the handle 10 triggered by the user from switching the recliner 1 from the locking position to the unlocking position.

In general, the users tend to apply an excessive load on the handle 10 when they want to unlock the recliner and such excessive loads can damage the internal components of the recliner itself, as the internal components of said recliner could rotate beyond the correct working range.

According to the present invention, when the user trigger the handle 10, the discontinuous recliner 1 is brought from the locking position (see also FIGS. 10a, 11a) to the unlocking position (see also FIGS. 10b, 11b), and the first plate 2 and the second plate 3 are free to rotate relative to each other. However, an excessive load on the internal components of the recliner 1 is prevented, as the path of the actuating element 9 is advantageously limited by the engagement of its humps 21 with the windows 23 of the second plate 3.

Accordingly, the relative rotation between the first and second plate 2, 3 in the unlocking position will be limited to a maximum angle θ, which is set by the length of the windows 23, so that a rotation beyond the correct working range due to an excessive load on the handle 10 is effectively prevented by adequately designing such windows 23.

In this way, the internal components of the discontinuous recliner 1 are effectively protected from excessive loads.

Figure 12:
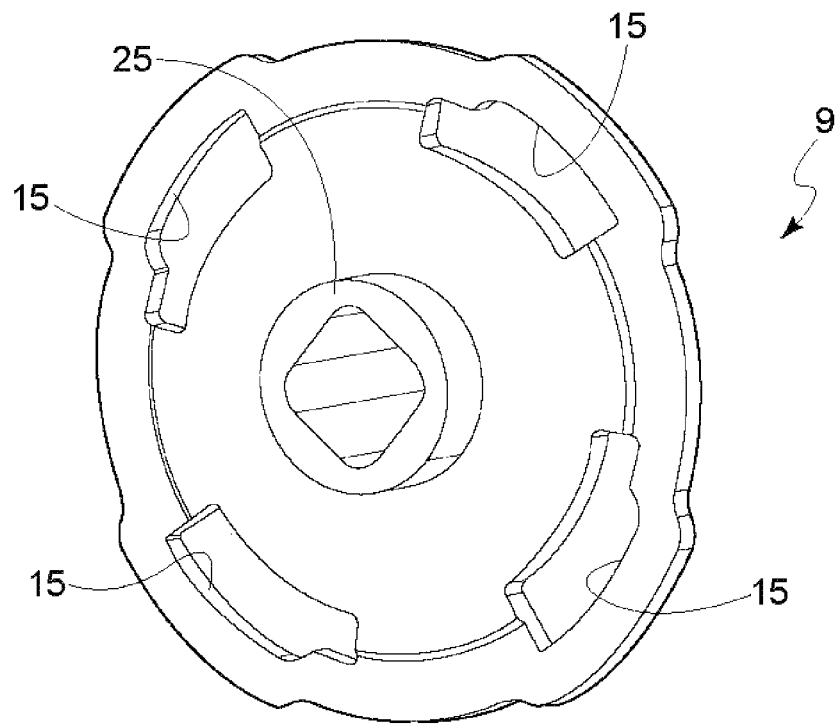
FIG. 12 is a perspective view of the actuating element of the discontinuous recliner of FIG. 6 from a different point of view.

With reference to FIG. 12, the discontinuous recliner 1 according to this second preferred embodiment differs from the one of the previously described, first preferred embodiment in that the actuating element 9 is provided, on its surface oriented towards the first plate 2, with a hub 25 protruding from said surface thereof and penetrating into a matching hole 20 centrally arranged in the first plate 2.

The provision of such hub 25 improves the stabilization of the discontinuous recliner 1 according to the invention.

Moreover, the provision of such hub 25 improves the synchronization between the recliners of the same vehicle seat, this avoiding potential delay between two recliners of the same vehicle seat.

This description of preferred embodiments of the invention has been given merely by way of example and several variants and modifications within the reach of the person skilled in the art can be envisaged, without departing from the scope of the invention as defined by the appended claims.

By way of example, the number of locking pawls may be different from the ones shown in the illustrated embodiment.

By way of further example, more than one return spring (e.g. a number of springs equal to the number of locking pawls) may be provided.

The invention claimed is:

1. A discontinuous recliner for a vehicle seat, which discontinuous recliner comprises:
   a first disc-shaped plate and a second disc-shaped plate, the first and the second disc-shaped plates substantially having the same diameter so that they can be coupled to each other,
   wherein the first disc-shaped plate comprises a peripheral rim oriented towards the second disc-shaped plate and provided with teeth on its inner surface, and
   wherein the second disc-shaped plate is provided with one or more locking pawls, which locking pawls have an outer surface in the radial direction and an inner surface in the radial direction, the outer surface in the radial direction of each of the locking pawls being provided with teeth, and which locking pawls are movable in the radial direction from a locking position, in which the teeth on their outer surface engage the teeth on the inner surface of the peripheral rim of the first disc-shaped plate, to an unlocking position, in which the teeth on their outer surface are spaced apart from the teeth on the inner surface of the peripheral rim of the first disc-shaped plate, and vice versa,
   wherein the discontinuous recliner is provided with a single actuating element for driving the locking pawls both from the unlocking position to the locking position and from the locking position to the unlocking position,
   wherein the discontinuous recliner comprises a single return spring, having the shape of a spiral, in which a first, outer end and a second, inner end are defined, the first, outer end of the return spring being inserted into a hole provided in the second disc-shaped plate, and the second, inner end of the return spring being wound to form a square and being fitted on a square boss provided on the actuating element, and
   wherein the actuating element is provided, on its surface oriented towards the first disc-shaped plate, with a protruding hub that penetrates into a matching hole centrally provided in the first plate, and the actuating element is provided, on its surface oriented towards the second plate, with a protrusion that penetrates into a matching hole centrally provided in the second plate.

2. The discontinuous recliner according to claim 1, wherein the actuating element has a flat, disc-shaped body, which lies on the surface of the first disc-shaped plate oriented towards the second disc-shaped plate.

3. The discontinuous recliner according to claim 2, wherein the actuating element comprises a plurality of projections, one for each locking pawl, which projections protrude towards the second disc-shaped plate, each projection having an outer surface in the radial direction, wherein the outer surface in the radial direction of each projection has a shaped profile and the inner surface in the radial direction of each locking pawl has a corresponding shaped profile, the shaped profiles of the outer surface of the projections of the actuating element and the shaped profiles of the inner surface of the locking pawls cooperating for pushing the locking pawls to the locking position.

4. The discontinuous recliner according to claim 1, wherein the actuating element comprises a plurality of slots, one for each of the locking pawls, which slots have a first section which is farther from the center of the actuating element, and a second section that progressively extends closer to the center of the actuating element, and wherein each of the locking pawls is provided with a peg projecting towards the first disc-shaped plate and arranged so as to penetrate into a corresponding slot of the actuating element and to engage the edge of the slot.

5. The discontinuous recliner according to claim 1, wherein the locking pawls are equally spaced along the circumference of the second disc-shaped plate.

6. The discontinuous recliner according to claim 1, wherein the second disc-shaped plate is provided with one or more radial guiding grooves, each of the radial guiding grooves receiving and guiding a respective one of the locking pawls.

7. The discontinuous recliner according to claim 1, wherein the discontinuous recliner is provided with an annular cover for coupling together the first and the second disc-shaped plates.

8. The discontinuous recliner according to claim 1, wherein the actuating element is provided, on its surface oriented towards the second disc-shaped plate, with one or more humps, which engage corresponding one or more windows provided in the second disc-shaped plate.

9. The discontinuous recliner according to claim 8, wherein the one or more humps comprise a plurality of humps that are equally spaced along the circumference of the actuating element and the one or more windows comprise a plurality of windows that are equally spaced along the circumference of the second disc-shaped plate.

10. The discontinuous recliner according to claim 9, wherein the plurality of humps consists of two humps and the plurality of windows consists of two windows, wherein the actuating element, is provided, on its surface oriented towards the second disc-shaped plate, with the two humps arranged at 180° relative each other, and the second disc-shaped plate is correspondingly provided with the two windows arranged at 180° relative each other.

11. A discontinuous recliner for a vehicle seat, which discontinuous recliner comprises:
   a first disc-shaped plate and a second disc-shaped plate, the first and the second disc-shaped plates substantially having the same diameter so that they can be coupled to each other;

wherein the first disc-shaped plate comprises a peripheral rim oriented towards the second disc-shaped plate and provided with teeth on its inner surface;

wherein the second disc-shaped plate is provided with one or more locking pawls, which locking pawls have an outer surface in the radial direction provided with teeth, and which locking pawls are movable in the radial direction from a locking position, in which the teeth on their outer surface engage the teeth on the inner surface of the peripheral rim of the first disc-shaped plate, to an unlocking position, in which the teeth on their outer surface are spaced apart from the teeth on the inner surface of the peripheral rim of the first disc-shaped plate, and vice versa;

wherein the discontinuous recliner is provided with a single actuating element for driving the locking pawls both from the unlocking position to the locking position and from the locking position to the unlocking position; and wherein the actuating element is provided, on its surface oriented towards the second disc-shaped plate, with one or more humps, which engage corresponding one or more windows provided in the second disc-shaped plate.

12. The discontinuous recliner according to claim 11, wherein the one or more humps comprise a plurality of humps that are equally spaced along the circumference of the actuating element and the one or more windows comprise a plurality of windows that are equally spaced along the circumference of the second disc-shaped plate.

13. The discontinuous recliner according to claim 12, wherein the plurality of humps consists of two humps and the plurality of windows consists of two windows, wherein the actuating element, is provided, on its surface oriented towards the second disc-shaped plate, with the two humps arranged at 180° relative each other, and the second disc-shaped plate is correspondingly provided with the two windows arranged at 180° relative each other.

* * * * *